United States Patent
Miao

(10) Patent No.: US 7,397,877 B2
(45) Date of Patent: Jul. 8, 2008

(54) CLOCK DRIFT COMPENSATION METHOD FOR REMOTE COMMUNICATIONS

(75) Inventor: Kai Miao, Boonton, NJ (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 10/854,972

(22) Filed: May 27, 2004

(65) Prior Publication Data

US 2005/0265500 A1    Dec. 1, 2005

(51) Int. Cl.
*H04L 7/00*    (2006.01)
(52) U.S. Cl. .................................... 375/356
(58) Field of Classification Search ......... 375/355–356, 375/371; 370/507, 516, 518
See application file for complete search history.

(56) References Cited

U.S. PATENT DOCUMENTS

| | | | |
|---|---|---|---|
| 5,790,612 A * | 8/1998 | Chengson et al. | 375/373 |
| 5,918,040 A * | 6/1999 | Jarvis | 713/375 |
| 6,327,274 B1 * | 12/2001 | Ravikanth | 370/516 |
| 6,480,491 B1 | 11/2002 | Miao | |
| 6,661,810 B1 * | 12/2003 | Skelly et al. | 370/516 |
| 6,975,656 B1 * | 12/2005 | Madhavapeddi et al. | 370/518 |
| 7,085,268 B2 * | 8/2006 | Fukuda et al. | 370/389 |

OTHER PUBLICATIONS

Pending U.S. Appl. No. 09/585,744; Inventor: Kai Miao; filed Jun. 2, 2000.

* cited by examiner

*Primary Examiner*—Khanh C. Tran
(74) *Attorney, Agent, or Firm*—Kacvinsky LLC

(57) ABSTRACT

A system may include a buffer, a local clock, and a processor. The buffer may store and output received media information. The local clock may control a rate at which the buffer outputs stored media information. The processor may determine a number of mean time differences between the local clock and a remote clock at a corresponding number of different times. The processor may also detect whether the local clock has drifted relative to the remote clock based on the number of mean time differences, and the processor may adjust the local clock if the local clock has drifted.

15 Claims, 2 Drawing Sheets

CLOCK DRIFT COMPENSATION METHOD FOR REMOTE COMMUNICATIONS

BACKGROUND

Implementations of the claimed invention generally may relate to communication of media information and, more particularly, to synchronizing such media information.

Communication of media information (e.g., real-time voice or video communications) over networks has become more and more prevalent. Reliably communicating such media information over, for example, the Internet may involve clock synchronization between different systems, such as media gateways, Internet Protocol (IP)-based phones, personal computers (PCs), Media Servers, etc. Such synchronization may be desirable, whether for an IP-based two-way voice conversation, for example, or for IP-based multimedia conferencing. Unsynchronized clocks between any two systems in communication may severely impair reception and/or playback quality, which may be intolerable to a user.

Clock drifting, where one system clock may run a little faster than another, may typically cause lack of synchronization over a network, such as the Internet. Clock drifting may pose a significant engineering challenge for real-time communication of media information.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
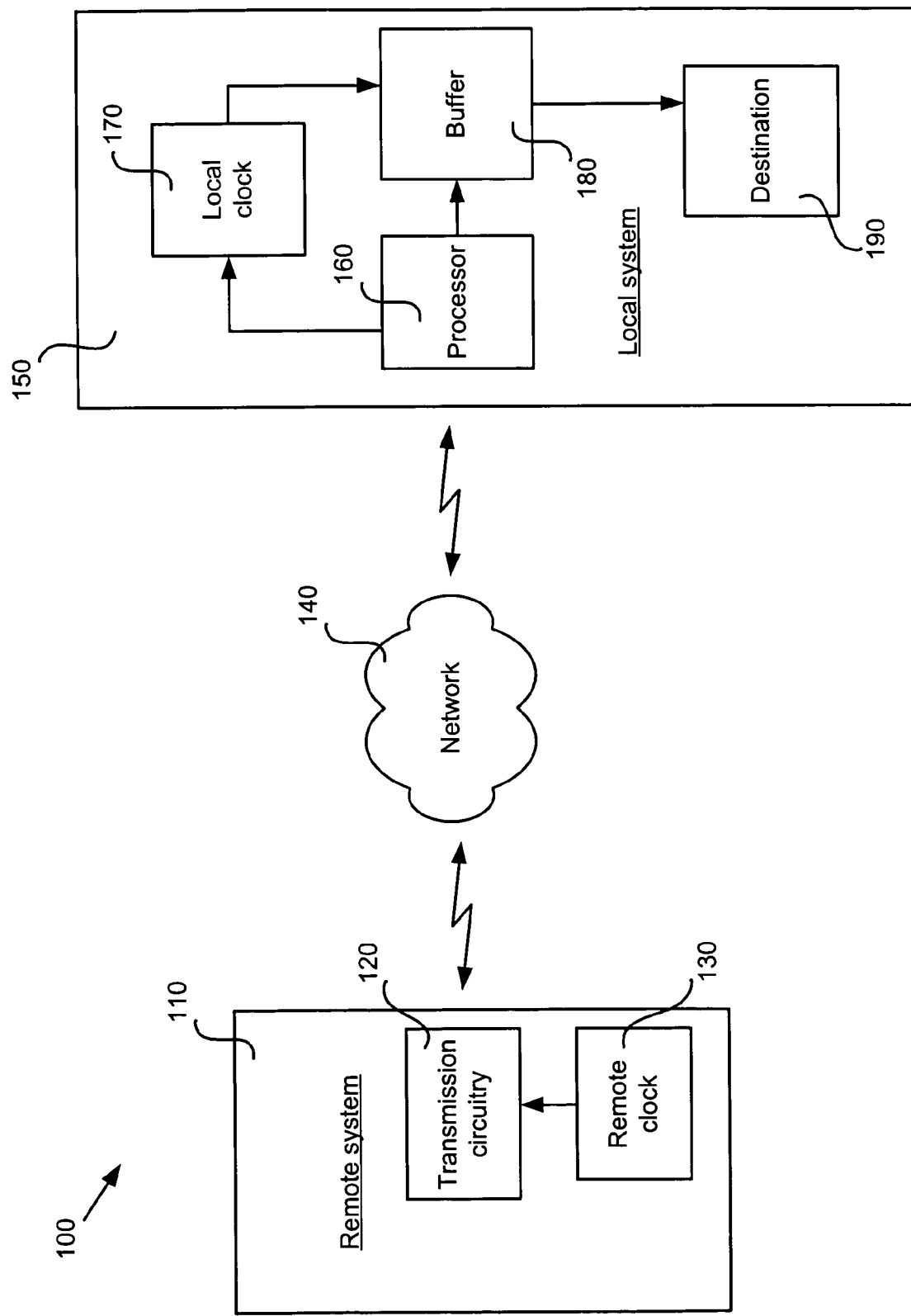
FIG. 1 illustrates an example system.

FIG. 1 illustrates an example system 100. Example implementations of system 100 may include devices communicating over a network (e.g., the Internet or another packet-based network), although the claimed invention is not limited in this regard. Although system 100 is illustrated as including discrete components, these components may be implemented in hardware, software/firmware, or some combination thereof. When implemented in hardware, some components of system 100 may be combined in a certain chip or device.

System 100 may include a remote system 110, a network 140, and a local system 150. Remote system 110 may send media information to local system 150 via network 140. In some implementations, local system 150 may send media information (and possibly other communication-related information) to remote system 110 via network 140. For the purposes of explanation, the media information transmitted may include voice and/or video information, but the claimed invention is not limited in this regard. Local system 150 may receive and process other types of media information consistent with the description herein.

The media information provided by remote system 110 may include video information encoded in a format such as MPEG-1, MPEG-2, MPEG-4, H.264, Windows Media Video version 9 (WMV9) and Advanced Video System (AVS) formats. As used herein, "video information" may include and/or imply accompanying audio information, because audio information typically may accompany video information in video applications. Such audio information may be encoded in various formats, such as those produced by G.7xx audio compression codecs (e.g., including G.711, G.721, G.722, G.726, G.727, G.728, and/or G.729 ITU-T standards), 3G Adaptive Multi-Rate (AMR) codecs, etc. The claimed invention is not limited to the formats specifically mentioned herein; rather any now-known or later-developed media format may be used in accordance with the schemes disclosed herein. The media information may also or alternately include other information, such as telephony or other audio information.

Remote system 110 may include transmission circuitry 120 and a remote clock 130. Transmission circuitry 120 may include, for example, communication circuitry to send media information across network 140. In some implementations, transmission circuitry 120 may also include formatting circuitry to format the media information prior to transmission. In some implementations, other circuitry (e.g., a processor) (not shown) may format the media information before it is received by transmission circuitry 120. The rate at which transmission circuitry 120 may transmit data may be based, at least in part, on remote clock 130.

Transmission circuitry 120 may include circuitry and/or physical interfaces to communicate over network 140. If network 140 includes wired (e.g., electrical and/or optical) communication links, transmission circuitry 120 may include modulation/demodulation circuitry to support a particular set of communication protocols (e.g., Ethernet, telephony, asynchronous transfer mode (ATM), etc.). Similarly, if network 140 includes wireless (e.g., radio frequency) communication links, transmission circuitry 120 may include modulation/demodulation circuitry and an antenna to support a particular set of communication protocols (e.g., IEEE 802.11a, IEEE 802.11b, IEEE 802.11g, IEEE 802.16, etc.).

Remote clock 130 may provide a clock signal upon which to base the transmission and/or reception of media information. Remote clock 130 may be adjusted, in some implementations, based on information received from local system 150 via transmission circuitry 120. For example, in the presence of information loss in network 140, the frequency of remote clock 130 may be increased to avoid starving local system 150 of information. In other situations, the frequency of remote clock 130 may be decreased to avoid overflowing buffers or other storage in local system 150.

Network 140 may include one or more wired and/or wireless communication links between remote system 110 and local system 150. Although network 140 may, in some implementations, include a single communication link, in other implementations, it may include a more extensive network, such as a public switched telephone network (PSTN), a local area network (LAN), a wide area network (WAN), the Internet, or some combination thereof.

Local system 150 may include a processor 160, a local clock 170, a buffer 180, and a destination 190. Although not explicitly illustrated, in some implementations local system may include reception circuitry (not shown) similar to transmission circuitry 120 in remote system 120. In some implementations, such transmission/reception circuitry may be separate from processor 160, but in some implementations it may be included in processor 160. Such transmission/reception circuitry in system 150 may be arranged to receive information from a wired, optical, or wireless transmission medium of network 140. The receiver in system 150 may, or may not, operate in conjunction with a tuner or other device to separate desired information from other received information.

Processor 160 may include a general-purpose or a specific-purpose processing device and/or logic. Processor 160 may be arranged to process media information received from network 140. Processor 160 may direct the received media information to buffer 180. Processor 160 may also operate to control local clock 170. In performing such control, processor 160 may be arranged to perform clock-synchronization processing and/or calculations as described in further detail herein.

Local clock 170 may include adjustable circuitry to produce a local clock signal. Local clock 170 may output the local clock signal to buffer 180 to server as a basis for outputting stored media information from buffer 180. Local clock 170 may be controlled by processor 170 to be synchronized with remote clock 130 in remote system 110. Such synchronization of local clock 170 may facilitate operation of local system, for example preventing starvation of buffer 180, reducing playback jitter, and/or reducing clock drifting as is further described herein.

Buffer 180 may include a memory or storage device, such as a random access memory (RAM) device. Buffer 180 may receive media information from processor 180 and store it for a limited time until output to destination 190. The output data rate of buffer 180 may depend, directly or indirectly, on the local clock signal from local clock 180.

Destination 190 may be arranged to store, output, and/or play the media information from buffer 180. In some implementations, destination 190 may include a playout device (e.g., a video and/or audio playing device) to present the media information to a user. In some implementations, destination 190 may include an output interface to provide another system or another component of local system 150 (not shown) access to the media information from remote system 110. Such a physical output interface may be optical, electrical, wireless, etc., and may conform to one or more existing or later-developed interface specifications for transmitting and/or accessing data.

In some implementations, destination 190 may include a storage device for storing the media information. For example, destination 190 may include a hard disk or flash memory to store information. In some implementations, destination 190 may include a writeable optical drive (e.g., DVD-RW, etc.) to transfer media information to a portable storage medium. A display processor or other output device (not shown) may output the media information from destination 190 for playback or some other purpose. Although several exemplary implementations have been discussed for destination 190, the claimed invention should not be limited to those explicitly mentioned, but instead should encompass any device or interface capable of transmitting, outputting, or storing the media information from buffer 180.

Figure 2:
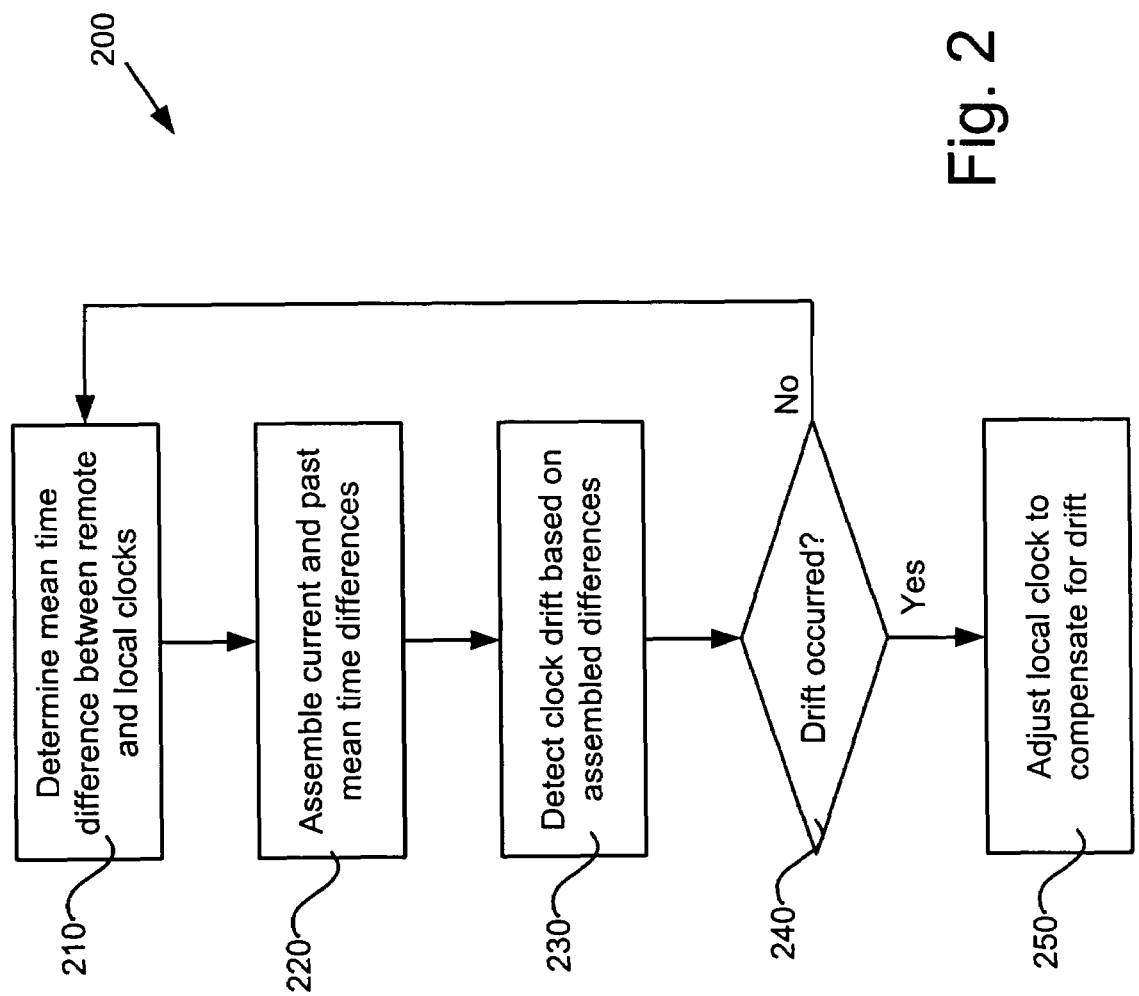
FIG. 2 is a flow chart illustrating an example process of adjusting for clock drifting.

FIG. 2 is a flow chart illustrating a process 200 of detecting clock drifting and adjusting local clock 170 if such drifting is detected. Although process 200 may be described with regard to system 100 for ease of explanation, the claimed invention is not limited in this regard.

Processing may begin with local processor 160 determining a mean time difference between remote clock 130 and local clock 170 [act 210]. Conceptually, processor 160 may determine the following: Mean (Local Time−Remote Time), which may change linearly if clock drifting between clocks 130 and 170 occurs. The Remote Time in this conceptual expression may be determined from a time stamp in each real-time transport protocol (RTP) packet transmitted by remote system 110, and the Local Time may be determined by the time a packet arrives as measured by local clock 170. By taking the mean of the difference between the Local and Remote time stamps, random variations in this mean time difference may be removed, leaving a fixed mean time difference.

Expressed somewhat more rigorously, in act 210 processor 160 may calculate at each time instant n, the difference between the Local Time and the Remote Time, d(n), from:

$$d(n) = \text{Local Time}(n) - \text{Remote Time}(n)$$

The time difference d(n) may, in some implementations, already be calculated by processor 160 (e.g., in a histogram or statistics-based jitter buffer algorithm). The mean m(n) of this difference d(n) may be calculated recursively in real time by:

$$m(n) = N*d(n)/n + (n-1)*m(n-1)/n$$

where, N is a window of samples over which the mean is calculated. Although this expression may illustrate one example way to calculate a mean time difference, other smoothing schemes may also be used to remove random variations introduced by network 140.

Processing may continue with local processor 160 assembling present and past mean time differences m(n) [act 220]. In some implementations, processor 160 may assemble the following current and past values:

$$m(n), m(n-T), m(n-2T), \text{ and } m(n-3T)$$

where T is a (possibly adjustable) constant increment or period of time. Here, m(n−T) denotes the value of m(n) one period, T, ago. The mean difference values m(n−2T), and m(n−3T) may be similarly conceptualized. Although this specific example four periodic mean time differences, other numbers of differences (e.g., two, three or more) may be gathered consistent with the teachings herein.

Processing may continue with local processor 160 detecting a clock drift between remote clock 130 and local clock 170 based on the assembled differences in act 220 [act 230]. In some implementations, processor 160 may make one or more comparisons based on the assembled values m(n), m(n−T), etc. In one example implementation, processor 160 may determine whether the following conditions:

$$m(n) > m(n-T) + \Delta$$

$$m(n-T) > m(n-2T) + \Delta$$

$$m(n-2T) > m(n-3T) + \Delta$$

hold for a sufficiently small enough Δ, clock drifting between clocks 130 and 170 may have occurred. If there is a roughly linear increase in mean difference from time n−3T, to time n−2T, to time n−T, to time n, as may occur to satisfy the above equations, such increase may indicate local clock 170 being faster than remote clock 130 (e.g., drifting).

Similarly, if $$m(n) < m(n-T) - \Delta$$

$$m(n-T) < m(n-2T) - \Delta$$

$$m(n-2T) < m(n-3T) - \Delta$$

hold for a sufficiently small enough $\Delta$, clock drifting between clocks 130 and 170 may have occurred. If there is a roughly linear decrease in mean difference from time n−3T, to time n−2T, to time n−T, to time n, as may occur to satisfy the above equations, such decrease may indicate local clock 170 being slower than remote clock 130 (e.g., drifting).

It should be noted, however, that the determination of drifting also may be made when any one one, or two, of the above equations are satisfied, depending on details of a particular implementation. Other schemes for determining clock drift other than the linear, backward-looking scheme described above are both possible and contemplated. Such schemes may be employed, with varying degrees of effectiveness and computational complexity, based on a smoothed value of d(n), such as the mean m(n) described above.

If act 230 detects no clock drifting between local clock 170 and remote clock 130, processing may return to act 210 for another calculation of the mean time difference m(n) [act 240]. If act 230 detects clock drifting, however, processor 160 may adjust local clock 170 to compensate for the drifting to ensure communication quality between remote system 110 and local system 150 [act 250]. For example, local clock 170 may be adjusted by an amount:

−(m(n)−m(n−T))/T, where T is the interval within which each adjustment occurs. As one numerical example, the local clock 170 may be adjusted by −2 ms in every T=10 s interval. In such a case, the amount of estimated clock drift is 0.002/10 or 0.02%. The adjusted local clock 170 may be used to control the timing of media information (e.g., voice or video) output from the jitter buffer. Process 200 may facilitate not only "synchronization" between local clock 170 and remote clock 130, but also jitter-free, real-time voice or video delivery due to gradual adjustment of local clock 170.

Process 200 may be implemented, for example, in software that may be executed by processor 160 or another portion of local system 150. Such software module may detect clock drift and estimate the amount of drift that has occurred in accordance with the description herein. The difference d(n) (and possibly the mean m(n)) between the local time and remote time may be available to processor 160 via histogram-based, jitter buffering algorithms that may also be present.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention.

For example, although process 200 has been described with regard to three inequalities using periodic mean time differences, greater or lesser numbers of values and inequalities may be used to detect clock drifting. For example, one calculated inequality may include m(n) and m(n−2T), or another inequality may include m(n) and m(n−3T) difference values. Also, the particular values of N, T, and $\Delta$ above may be varied as appropriate to achieve suitable operation.

Moreover, the acts in FIG. 2 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A method, comprising:
sequentially determining mean time differences between a local clock and a remote clock at a corresponding plurality of different times;
assembling sequential mean time differences;
detecting whether the local clock has drifted relative to the remote clock based on the assembled differences;
comparing one mean time difference at one time with another mean time difference at another time; and
detecting whether the local clock has drifted relative to the remote clock based on the comparing.

2. The method of claim 1, further comprising:
receiving information that indicates a time of the remote clock.

3. The method of claim 1, wherein the sequentially determining includes:
determining a mean time difference for a present time based on at least one mean time difference for a past time.

4. The method of claim 1, wherein the assembling includes:
assembling a mean time difference for a present time and a mean time difference for a first past time.

5. The method of claim 4, wherein the assembling includes:
assembling a mean time difference for a second past time and a mean time difference for a third past time.

6. The method of claim 1, wherein the detecting includes:
ascertaining whether an increasing trend or a decreasing trend exists between pairs of the sequential mean time differences.

7. The method of claim 1, further comprising:
repeating the sequentially determining, the assembling, and the detecting if the detecting detects that the local clock has not drifted relative to the remote clock.

8. The method of claim 1, further comprising:
adjusting the local clock if the detecting detects that the local clock has drifted.

9. A system, comprising:
a buffer to store and output received media information;
a local clock to control a rate at which the buffer outputs stored media information; and
a processor to determine a plurality of mean time differences between the local clock and a remote clock at a corresponding plurality of different times, to detect whether the local clock has drifted relative to the remote clock based on the plurality of mean time differences, and to adjust the local clock if the local clock has drifted;
wherein the processor compares one mean time difference at one time with another mean time difference at another time and detects whether the local clock has drifted relative to the remote clock based on the comparison.

10. The system of claim 9, further comprising:
a destination to receive media information that has been output by the buffer.

11. The system of claim 10, wherein the destination includes:
a storage device, a playout device, or an output interface.

12. The system of claim 9, wherein the processor determines a mean time difference at a given time based on at least one mean time difference at a time earlier than the given time.

13. A computer-accessible medium including instructions that, when executed, cause a computer to:
determine a first mean time difference between a local clock and a remote clock for a first time;
determine a second mean time difference between the local clock and the remote clock for a second time based on the first mean time difference;
determine a third mean time difference between the local clock and the remote clock for a third time based on the second mean time difference;
compare the third mean time difference and the second mean time difference;
compare the second mean time difference and the first mean time difference; and
detect whether the local clock has drifted relative to the remote clock based on comparing the third mean time difference and the second mean time difference and on comparing the second mean time difference and the first mean time difference.

14. The computer accessible medium of claim 13, further including instructions that, when executed, cause the computer to:
adjust the local clock if the local clock has drifted relative to the remote clock.

15. The computer-accessible medium of claim 13, further including instructions that, when executed, cause the computer to:
detect that the local clock has drifted if both the third and second mean time differences are increasing or decreasing relative to the second and first mean time differences.

* * * * *